Patented Apr. 1, 1952

2,591,254

UNITED STATES PATENT OFFICE 2,591,254

METHOD FOR PRODUCING RUBBER POLYMER-SULFUR DIOXIDE FILAMENTS

Johannes Thomas Hackmann, Amsterdam, Netherlands, assignor to Shell Development Company, San Francisco, Calif., a corporation of Delaware No Drawing. Application December 31, 1949, Serial No. 136,409. In the Netherlands March 24, 1949

6 Claims. (Cl. 18—54)

This invention relates to the formation of reaction products between high molecular weight, polyunsaturated compounds and sulfur dioxide, and it is particularly directed to a process for increasing the reactivity of said polyunsaturated compounds in this reaction through treatment with a chlorine oxide.

The term "high molecular weight, polyunsaturated compound," as employed herein, embraces those compounds having a molecular weight of at least 5,000 and which contain a plurality of unsaturated linkages in the molecule. These compounds are either polymers of organic compounds containing a plurality of unsaturated linkages in the molecule, or are copolymers of such multiple-unsaturated compounds with other unsaturated organic compounds of one type or another. The term includes the various natural rubbers such as latex, crepe, sheet, caoutchouc, gutta percha, balata, and cyclo rubbers, as well as unsaturated synthetic rubbers. Representative synthetic polymers of high molecular weight are the polymerization products of butadiene and those of its homologues and derivatives, as, for example, methyl butadiene polymers, dimethyl butadiene polymers, pentadiene polymers, and chloroprene polymers (neoprene synthetic rubber). Representative copolymers of high molecular weight which come within the term are those formed from butadiene, its homologues and derivatives, with other unsaturated organic compounds. Among the latter are the acetylenes, as vinyl acetylene, the olefins, as isobutylene which copolymerizes with butadiene to form butyl synthetic rubber; the vinyls, as vinyl chloride, acrylic acid, acrylonitrile (which polymerizes with butadiene to form the synthetic rubber Buna-N), methacrylic acid, and styrene, the latter compound polymerizing with butadiene to form the synthetic rubber Buna S; as well as the vinyl esters and various unsaturated aldehydes, ketones, and ethers, e. g., acrolein, methyl isopropenyl ketone, and vinyl ethyl ether. The above-defined, polyunsaturated, high molecular weight compounds, including both natural and synthetic rubbers, may properly be termed "high molecular weight polymers of diene-hydrocarbons," or preferably, "rubbery polymers of at least one compound selected from the group consisting of the conjugated diolefins and chloroprene."

It is known to react sulfur dioxide with high molecular weight, polyunsaturated compounds to form products of one type or another, and particularly filaments and similar shapes of a continuous, unsupported nature. However, this reaction is a slow one, particularly when materials of high purity are used, and under normal circumstances the reaction proceeds to but a limited degree even when extended over a period of several days' duration. This is undesirable, especially when forming filaments and other continuous objects from high molecular compounds by extruding a solution thereof into a coagulating bath containing available sulfur dioxide, where the respective reactants combine to form an insoluble product whose shape, in cross-section, conforms to that of the aperture through which extrusion took place. In such operations it is of great importance that an extensive reaction between the materials takes place as rapidly as possible since the objects formed in the bath remain therein for but a few seconds or less under normal operating conditions. Such a result can only be obtained by treating the high molecular weight, polyunsaturated reactant with an activator before it is injected into the coagulating bath. One method of this character being disclosed in U. S. Patent No. 2,469,842, issued May 10, 1949, where the activator employed is a hydroperoxide. While use of hydroperoxide activating agents is, in the main, quite satisfactory, it would be desirable if still other activator compounds were available, especially those which could be used in substantially lesser amounts than is the case with many of the activators now employed.

It is an object of this invention to provide a method for increasing a reactivity of high molecular weight, polyunsaturated compounds such as natural rubber or butadiene synthetic rubber, for example, as regards sulfur dioxide. A more particular object is to provide a class of compounds having the ability to effect such activation of the high molecular weight reactant even when present in relatively small amount.

Still another object of this invention is to provide an improved method for producing filaments made up of a polyunsaturated, high molecular weight compound combined with a relatively large amount of sulfur dioxide, and which are well adapted to be woven into fabrics. Other objects of the invention will be apparent from the nature of the following description.

It is my discovery that the foregoing objects are achieved when the rubber or other high molecular weight, polyunsaturated rubbery polymer is treated with a chlorine oxide prior to being reacted with sulfur dioxide. These chlorine oxides, which term includes chlorine monoxide, chlorine dioxide, chlorine tetroxide and chlorine heptoxide, may be used either singly or in combination, and the preferred members of the class, for use in the present invention, are chlorine dioxide and chlorine heptoxide.

In adding the chlorine oxide to the rubbery polymer, the oxide is preferably added in solution form, appropriate solvents for this purpose being chloroform, carbon tetrachloride or other halogenated hydrocarbon, for example. While the rubbery polymer reactant may be in either the dissolved, swollen or solid state at the time of the chlorine oxide addition, again the preferred practice is to have the same in solution (which term also includes dispersion) form and then to add the solution of chlorine oxide thereto. The resulting activation is achieved in a substantially instantaneous manner at room temperatures and under normal conditions of pressure.

It is an advantage of the present invention that relatively little of the chlorine oxide, as compared with the weight of the rubber or other rubbery polymer present, need be employed. Thus, good activation of natural rubber and of synthetic butadiene rubbery polymers, as well as other high molecular weight, polyunsaturated reactants, is achieved through use of from about 0.05 to 5% of the chlorine oxide based on the weight of rubber or similar reactant present. Polyunsaturated high molecular weight compounds activated with such amounts of chlorine oxide have the ability to react in a substantially instantaneous manner with relatively large amounts of sulfur dioxide, the products containing at least about 10% of combined sulfur dioxide, based on the overall weight of the dried material.

It is possible to vary widely the conditions under which such activated solutions of the rubbery polymer may be reacted with sulfur dioxide to form the desired products. When sulfur dioxide is introduced in either the gaseous, liquid, or dissolved state into a solution of the activated polymeric material, an amorphous reaction product is obtained which can be either dried into the desired solid form or used in the liquid condition, as in finishes of one type or another. On the other hand, when the solutions of the activated polymer are injected through apertures of a suitable size into a liquid bath containing dissolved sulfur dioxide (normally referred to as a "coagulating bath"), there are precipitated filamentary reaction products of a type which, on being withdrawn from the bath, washed and dried, may readily be woven together to form fabrics.

In some cases addition of the chlorine oxide to the high molecular weight, polyunsaturated reactant may give rise to a certain amount of carbonization. This can be avoided by giving the polymer starting material a preliminary treatment with a less effective oxidant such as hydrogen peroxide or hypochlorous acid, such treatment being preferably conducted when said polymer is dispersed in water as is the case with the various rubber latexes, for example.

The following examples serve to illustrate the invention in various of its embodiments:

*Example I*

In this operation it was desired to react natural rubber with sulfur dioxide. Accordingly, a rubber starting material was prepared using 200 grams of 55% rubber latex to which was added 2 grams of casein in 30 grams of a 10% ammonia solution, the resulting mixture being stirred and air-blown to remove the ammonia as quickly as possible. To this solution were then added 19 cc. of a 6% solution of hydrogen peroxide, following which the mixture was stirred over a steam bath for from about 20 to 30 minutes, when foaming began to decrease. The mixture was then cooled and admixed with another 19 cc. portion of the hydrogen peroxide solution, stirred for 3 hours at room temperature and thereafter for one hour at 40 to 50° C. Finally, the latex was coagulated with acetic acid. The coagulate was washed with water, dried, plasticized by rolling, and then dissolved to form 6.5% solution in a solvent made up of equal parts by volume of benzene and toluene.

The 6.5% solution of plasticized rubber, whose preparation is described in the preceding paragraph, was then divided into 4 portions. The first portion, regarded as the "blank," was admixed with approximately 3 times its volume of benzene saturated with sulfur dioxide. Though the resulting solution was observed for several hours, no coagulate formed therein. To the second, third and fourth portions of the rubber solution were then added 1% chlorine dioxide, 0.25% chlorine heptoxide and 0.125% chlorine heptoxide, respectively, these percentages being expressed in terms of the weight of rubber present in the solution, and the various oxides being added in the form of 5% solutions in carbon tetrachloride. Immediately after adding the chlorine oxides, a solution of sulfur dioxide in benzene was added to each of the solutions under the same conditions as described above in connection with the blank. In each case, coagulates formed immediately which were filtered off from the respective solutions, washed with benzene and dried. The coagulant prepared from the solution activated with chlorine dioxide was found to contain 7% by weight sulfur whereas those prepared using 0.25 and 0.125% of chlorine heptoxide contained 6.6 and 6.2% sulfur, respectively.

*Example II*

In this example, a 6% solution of plasticized natural rubber in a benzene-toluene solvent is activated by the addition of approximately 0.25% chlorine heptoxide, based on the weight of rubber present. This solution, on being spun into an ethanol-water bath (4:1 by volume) maintained at 5° C. and containing approximately 300 grams of dissolved sulfur dioxide per liter, reacts with the sulfur dioxide to form a filamentary precipitate which was continuously withdrawn from the bath, washed and dried. The resulting filaments were greatly superior, as regards tensile strength and general adaptability to be woven, to any which could be produced from the rubber solution without the addition of any activator compound. The filaments produced in the latter case contain only about 1% by weight sulfur as compared with about 7% in the case of those filaments where the rubber is first activated with chlorine heptoxide.

*Example III*

The process of the foregoing examples is repeated, but substituting for the rubber solution a chlorine heptoxide-activated, 6% solution of polybutadiene (obtained by polymerization of butadiene using sodium as a catalyst, molecular weight approximately 50,000). While the filaments obtained from this material contain a somewhat smaller amount of sulfur than is the case with those prepared from natural rubber

The invention claimed is:

1. In a process for producing filaments wherein a solution of a rubbery polymer of a conjugated diolefin is spun into a coagulating bath containing available sulfur dioxide wherein the polymer reacts with the sulfur dioxide to form a filamentary reaction product which is then withdrawn from the bath, the step comprising adding to said polymer solution from about 0.05 to 5%, in terms of the weight of polymer present in the solution, of a chlorine oxide.

2. The process of claim 1 wherein the rubbery polymer is a synthetic, rubbery, butadiene polymer.

3. The process of claim 1 wherein the rubbery polymer is a natural rubber.

4. The process of claim 1 wherein the rubbery polymer is a synthetic, rubbery, butadiene polymer and the chlorine oxide is chlorine dioxide.

5. The process of claim 1 wherein the rubbery polymer is a natural rubber and the chlorine oxide is chlorine dioxide.

6. The process of claim 1 wherein the rubbery polymer is a natural rubber and the chlorine oxide is chlorine heptoxide.

JOHANNES THOMAS HACKMANN.

REFERENCES CITED

The following references are of record in the file of this patent:

UNITED STATES PATENTS

| Number | Name | Date |
|---|---|---|
| 2,037,599 | Schweitzer | Apr. 14, 1936 |
| 2,265,722 | Nie | Dec. 9, 1941 |
| 2,288,982 | Waterman | July 7, 1942 |
| 2,469,847 | Nie | May 10, 1949 |

OTHER REFERENCES

Modern Inorganic Chemistry, Mellor, 9th ed., Longmans (1939), pages 507 and 508.